United States Patent [19]
Johnson

[11] 3,850,285
[45] Nov. 26, 1974

[54] ARTICLE TRANSPORT APPARATUS
[75] Inventor: John R. Johnson, Toledo, Ohio
[73] Assignee: Owens-Illinois, Inc., Toledo, Ohio
[22] Filed: July 26, 1973
[21] Appl. No.: 382,733

[52] U.S. Cl. ............... 198/179, 214/1 BA, 214/89
[51] Int. Cl. .......................................... B65g 17/12
[58] Field of Search .......... 198/179, 177; 214/1 BA, 214/89; 134/72, 83, 126, 131; 104/96, 97, 131

[56] References Cited
UNITED STATES PATENTS

| | | | |
|---|---|---|---|
| 1,844,627 | 2/1932 | Anderson | 198/177 |
| 2,198,068 | 4/1940 | Wadsworth | 198/179 |
| 2,319,474 | 5/1943 | Price | 198/179 |
| 2,432,871 | 12/1947 | Fedorchak et al. | 73/45.3 |
| 2,605,882 | 8/1952 | Curtis | 214/89 |
| 3,430,580 | 3/1969 | Edens | 104/96 |
| 3,637,074 | 1/1972 | Banyas | 209/74 |
| 3,734,027 | 5/1973 | Brummett et al. | 104/96 |
| 3,777,875 | 12/1973 | Sobran | 198/179 |

Primary Examiner—Evon C. Blunk
Assistant Examiner—Richard K. Thomson
Attorney, Agent, or Firm—Steve M. McLary; E. J. Holler

[57] ABSTRACT

Apparatus and method for preventing an empty article carrier from passing through an article treatment zone. An endless series of grasping means are moved by a drive mechanism in a closed path. At an article inlet station, each grasping means picks up one article from a single-file series of articles, transports the article through an article treatment zone, and then deposits it at an article outlet station. Whenever there is a gap in the series of articles and a grasping means does not pick up an article, the grasping means is elevated to a position above the article treatment zone. This prevents contact of the grasping means by the treatment material, the contact of the grasping means with the article being treated normally preventing contact of the grasping means with the treatment material.

13 Claims, 5 Drawing Figures

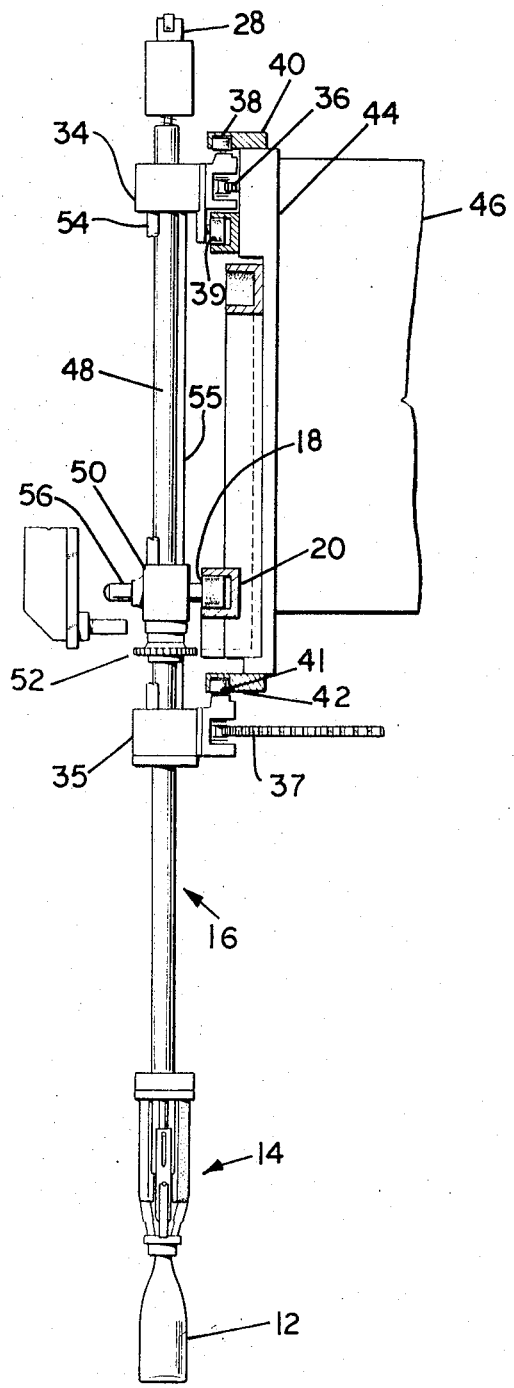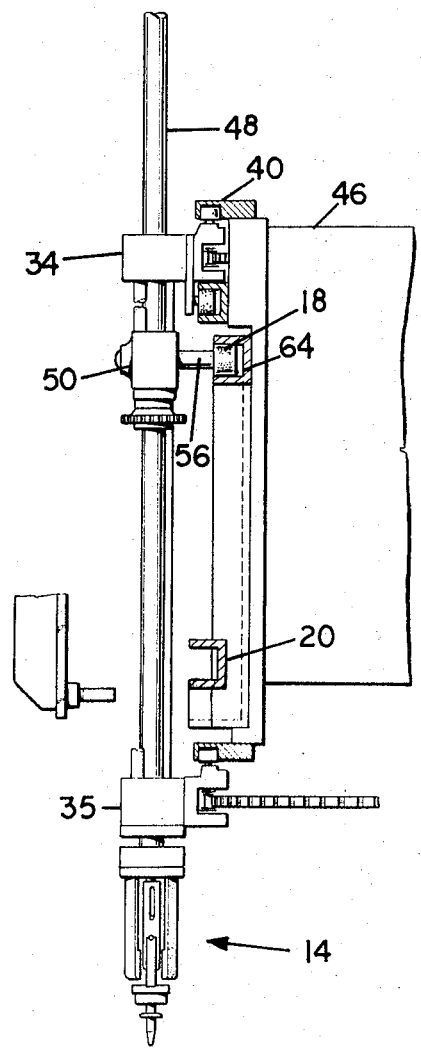
FIG. 4
FIG. 5

ARTICLE TRANSPORT APPARATUS

BACKGROUND OF THE INVENTION

This invention generally relates to article transfer apparatus. More particularly, this invention relates to article transfer apparatus of the type which picks up an article at one position, transports it through a treatment zone and deposits it at a second position. Specifically, this invention relates to an article transfer apparatus of the type described in which the article transport mechanism is raised to a position out of the article treatment zone in the event it has not picked up an article.

In many industries, article transfer apparatus of the type which picks up an article at one position, transports it through a treatment zone and deposits it at a second position are common. One such industry is that of glass container manufacturing. Many treatment materials are used for strengthening and decorative purposes, such materials being well known to those skilled in the art. These materials are frequently corrosive or highly adherent in nature. Thus, the article transport mechanism needs to be shielded from these materials to ensure long life and smooth operation. Two prior art transfer apparatus may be seen in U.S. Pat. Nos. 3,637,074 and 2,432,871. In general, the transport mechanism in the prior art would be protected from the treatment material so long as an article was carried. However, if no article were picked up, due, for example, to a gap in the series of articles presented for treatment, parts of the transport mechanism would be exposed to the treatment material. This, as was pointed out previously, is most undesirable. My invention overcomes this problem by moving the transport mechanism to a position out of the treatment zone whenever it fails to pick up an article.

SUMMARY OF THE INVENTION

My invention is an improvement in an apparatus of the type where a plurality of chucks are linked together in an endless chain. The chucks are moved in an endless path by a conveying means which supports the chucks. Each of the chucks carries a grasping means. At an article inlet position, the grasping means pick up articles one at a time. The chucks transport the articles through a treatment zone in single file. The articles are then released at a remote removal station. My improvement is a means for moving the grasping means to a position out of the treatment zone when no article is picked up by the grasping means.

BRIEF DESCRIPTION OF THE DRAWINGS

FIG. 4 is an end view, partially in cross section, taken along the line 4—4 of FIG. 1 showing the actual apparatus of the present invention; and FIG. 5 is an end view, partially in cross section, taken along the line 5—5 of FIG. 1 showing the actual apparatus of the present invention.

DETAILED DESCRIPTION OF THE DRAWINGS

Figure 1:
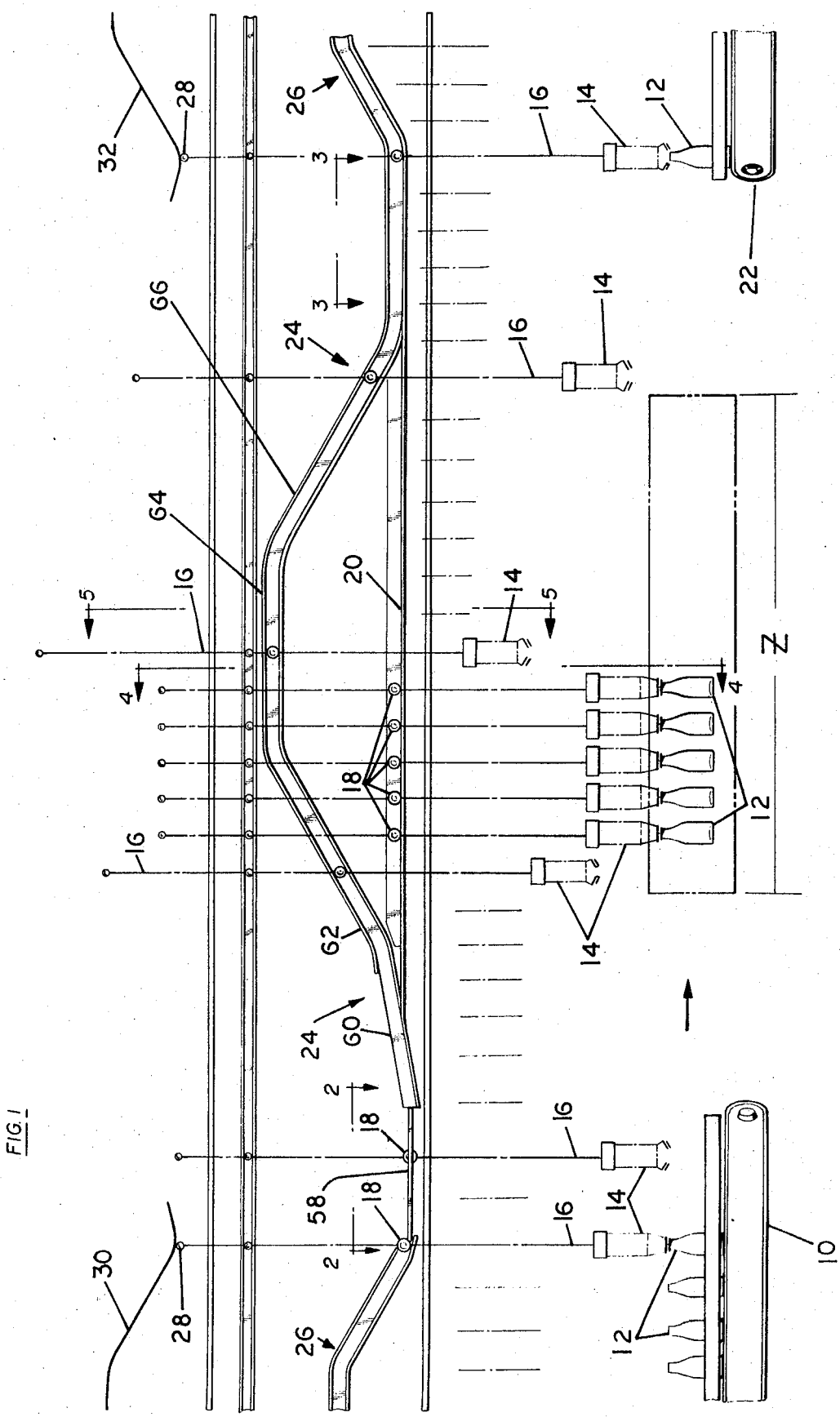
FIG. 1 is a schematic side elevational view of the apparatus of the present invention.

The apparatus of the preset invention is shown in schematic form in FIG. 1 to facilitate an understanding of its functioning. At an article inlet position or station, which, in this case, may be an endless belt-type conveyor 10, a plurality of articles, which may be glass containers 12, are presented in a spaced-apart, single-file manner. At the article inlet station 10, the articles 12 are picked up by a grasping means 14 which is carried by a chuck 16. In this particular apparatus, there are a plurality of chucks 16 mounted in a single-file fashion, and they are transported by a chain-type drive mechanism in an endless path. The general type of chain drive mechanism used may be seen in U.S. Pat. Nos. 2,432,871 or 3,637,074, the teachings of which are hereby incorporated by reference. The general type of grasping means 14 which is used is a jaw-type mechanism which may be seen in the previously cited U.S. Pat. No. 2,432,871. All of the chucks 16 are not shown, even in schematic form in FIG. 1, in the interest of simplicity, but rather their position is simply indicated by the center line of the position they would occupy. It should be kept in mind that the chucks 16 are spaced on equal centers in an endless series. Each of the chucks 16 have attached to them a cam follower 18 which can be used to control the vertical position of the grasping means 14. The cam followers 18 are engaged by a first cam means for holding the grasping means 14 in a location such that the glass containers 12 will be transported through an article treatment zone Z in a preferred orientation. The first cam means is made up of a track-type can section 20 which, as may be clearly seen in FIG. 1, engages the cam followers 18 and holds the cam followers 18 in a fixed location through the article treatment zone Z. As may be seen, the track-type cam section 20 extends from a location intermediate the end of the conveyor 10 and the beginning of the article treatment zone Z to a location immediately adjacent the beginning of an article removal or outlet station 22. The article removal station 22 may also be an endless belt-type conveyor such as that used in the article inlet station 10. One of the most important aspects of this invention is the fact that only those chucks 16 whose grasping means 14 pick up a glass container 12 at the article inlet station 10 are in proper orientation to have their cam followers 18 engaged by the first cam means 20. That is, in the event a glass container 12 is not in position to be picked up by the grasping means 14, the grasping means 14 will not be allowed to pass through the article treatment zone Z empty. This is necessary, since in the treatment zone Z the materials used to treat the glass containers 12 could deposit themselves upon an empty grasping means 14, thereby leading to eventual operational difficulties. It is therefore desirable that those grasping means 14 which do not pick up a glass container 12 should be moved to a position where they would not pass through the treatment zone Z. In order to accomplish this, a second cam means 24 is provided for raising the grasping means 14 to a location such that the grasping means 14 will be clear of the treatment zone Z if the grasping means 14 does not pick up a glass container 12. The second cam means 24 is made up of a number of portions which will be explained in greater detail with reference to further figures. However, for the time being, it is sufficient to note that those grasping means 14 which do not engage a glass container 12 at the article inlet station 10, are allowed to slip downwardly or slide downwardly toward the article inlet station 10 further than those grasping means 14 which do engage a glass container 12. In so doing, the cam followers 18 engage a portion of the second cam means 24 which causes them to follow a different path than that followed by the cam followers 18 associated with the grasping means 14 which have picked up a glass container 12. That is, those particular cam followers 18 will not be allowed to engage the first cam means 20. Throughout that part of the travel of the cam followers 18 which is not controlled by either the first cam means 20 or the second cam means 24, the position of the grasping means 14 is controlled by a third cam means 26 which engages the cam followers 18 and lowers the grasping means 14 to pick up glass containers 12 at the article inlet station 10 and raises the grasping means 14 to release the glass containers 12 at the article outlet station or removal station 22. It is readily apparent in FIG. 1, that the third cam means 26 directs the cam follower 18 downwardly at the article inlet station 10, thereby bringing the grasping means 14 into registry both longitudinally and elevationally with the glass containers 12. At the article pick-up point, the grasping means 14 are opened by engagement of a follower member 28 with a fixed cam 30. This is a conventional camming operation and forms no part of the present invention. The grasping means 14 are normally spring-loaded in a closed position, so that at this point engagement of the follower member 28 with the fixed cam 30 causes the grasping means 14 to be opened. Once the grasping means 14 are aligned with the glass container 12, the fixed cam 30 ends and the spring load of the grasping means 14 brings them closed, thereby holding the glass container 12 by the grasping means 14. At the article removal station 22, a second fixed cam 32 engages the follower member 28 and again opens the grasping means 14. It will be noted at this point, that the third cam means 26 is rising, thereby causing the grasping means 14 to move away from the glass container 12. With the second fixed cam 32 having opened the grasping means 14, the glass container 12 is free to continue on its path. Note that between the article inlet station 10 and the article removal station 22, there is no influence on the follower member 28, thereby keeping the grasping means 14 closed throughout this entire period.

Figure 2:
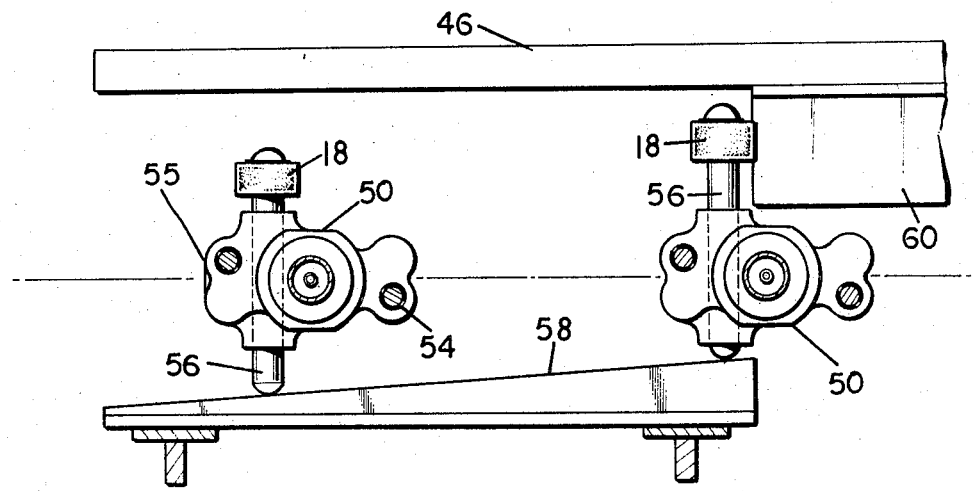
FIG. 2 is a top view, partially in cross section, taken along the line 2—2 of FIG. 1 showing the actual apparatus of the present invention.

FIGS. 2, 3, 4 and 5 are best considered as a unit; therefore reference now should be had to these four figures. With particular reference to FIG. 4, the chuck 16 is shown in more detail. In particular, an upper carrier member 34 and a lower carrier member 35 are respectively attached to and transported by an upper chain 36 and a lower chain 37. The upper and lower carrier members 34 and 35 are constrained to follow a fixed path of travel by the engagement of upper heeling followers 38 and 39 in an upper cam track 40 and engagement of a lower heeling follower 41 in a lower cam track 42. The upper and lower cam tracks 40 and 42 are attached to a main cam plate 44 which, in turn, is carried by a part of the structural framework 46 of the entire apparatus. A main spindle 48 is slidably mounted in the upper and lower carrier members 34 and 35. That is, the main spindle 48 is free to slide in and out of openings formed in the upper and lower carrier members 34 and 35. A follower block 50 is firmly attached to the main spindle 48 and movement of either the spindle 48 or the follower block 50 results in movement of the other member. Thus, if one were to move the follower block toward or away from the upper and lower carrier members 34 and 35, the main spindle 48 would be raised or lowered with respect to the article inlet station 10 or article outlet station 22. A sprocket 52 may be attached to the follower block 50 to allow rotation of the main spindle 48 if desired. To rotate the main spindle 48, the sprocket 52 could be engaged with a stationary section of chain or with a rack-type gear. In order to ensure stability during movement of the main spindle 48 and the follower block 50, guide rods 54 and 55 are attached between the upper carrier member 34 and the lower carrier member 35 and passed through the follower block 50. Thus, as the follower block 50 is moved up and down, the guide rods 54 and 55 ensure that the motion will be smooth and the main spindle 48 will not be jammed as a result of some component of movement away from vertical. The configuration shown in FIG. 4 is that which would be seen in the event that a glass container 12 had been picked up by the grasping means 14. It will be noted that the cam follower 18 is carried by the follower block 50 and is engaged in the first cam means 20. Engagement of the cam follower 18 and the first cam means 20, as should be obvious, will prevent the follower block 50 from moving either up or down. Thus, the glass container 12 is held at a fixed elevation determined by the location of the first cam means 20. Turning now to FIG. 2, it will be noted that the follower block 50 has extending completely through it a shaft 56 which is slidably mounted in a hole in the follower block 50. It can be seen that the shaft 56 extends beyond the follower block 50 on both sides of the follower block 50. The cam follower 18 is mounted on one extension of the shaft 56 while the other extension of the shaft 56 has nothing attached to it. The follower 18 and the shaft 56 together form an engagement means slidably mounted in the follower block 50 for engagement with the first cam means 20 or the second cam means 24. It should be quite clear that, in the event no cam is controlling the path of the cam follower 18, the follower block 50 may slip downwardly, at least until it is in contact with the lower carrier member 35. Recalling the general cam configuration of FIG. 1, it should be recalled that the third cam means 26 controls the path of travel of the cam follower 18 until the pickup point at the article inlet station 10. At this point, the follower block 50 is free to slip downward as far as possible. However, when a glass container 12 is present to be picked up, the grasping means 14 will contact the glass container 12 and thus the actual position of the glass container 12 on the conveyor 10 stops any further downward motion of the follower block 50. However, in the event there is no glass container 12 for pick-up, the follower block 50 may slip downwards still further. In this event, the shaft 56, as seen in FIG. 2, will contact a first inclined plate cam section 58 which is a part of the second cam means 24. The first inclined plate cam section 58 is positioned to contact the extending portion of the shaft 56 opposite the cam follower 18 only if a glass container 12 is not picked up by the grasping means 14. That is, the plate cam section 58 is positioned in a plane below that which would normally be occupied by the shaft 56 if a glass container 12 were present to limit the downward travel of the follower block 50. The plate cam section 58 extends from a location just adjacent the normal pick-up location of the glass containers 12 to a location adjacent the end of the article inlet station 10. The plate cam 58 is shaped such that it will push the slidable shaft 56 partially through the carrier block 50 and will thereby increase the extension of the cam follower 18 beyond the follower block 50. This is clearly shown in FIG. 2. A ramp cam section 60 of the second cam means 24 begins at the end of the first inclined plate cam section 58. The ramp cam section 60 engages the followers 18 which have been pushed out by the first plate cam section 58 at approximately the elevation at which they are traveling at that time. In addition, however, as may be seen in FIG. 1, the ramp cam section 60 will also engage those followers 18 which are associated with follower block 50 whose grasping means 14 have picked up glass containers 12. However, the engagement point of such followers 18 associated with grasping means 14 carrying glass containers 12 will be at a somewhat higher elevation since these followers 18 have never been allowed to fall as low as those which were engaged by the plate cam section 58. As the ramp cam section 60 ends, the first cam means 20 intersects with the ramp cam section 60. At this intersection point, those followers 18 associated with grasping means 14 carrying glass containers 12 are in a position to engage the first cam means 20. However, note that those cam followers 18 associated with follower blocks 50 which have no glass container 12 engaged by the grasping means 14 are in a different position. These followers 18 are engaged with a rising cam portion 62 of the second cam means 24. The rising cam portion 62 raises the cam followers 18 to a fixed elevation above the treatment zone Z. The rising cam portion 62 then connects with a dwell cam portion 64, best seen in FIG. 1, which is substantially coextensive with the treatment zone Z. The dwell cam portion 64 is designed to hold the cam follower 18 at a fixed elevation above the treatment zone Z. By doing so, the grasping means 14 is likewise held in a position which is above the treatment zone Z. The dwell cam portion 64 then connects with a falling cam portion 66 of the second cam means 24 which moves the cam follower 18 downwardly which, in turn, begins to move the grasping means 14 toward the elevation held by those grasping means 14 which had carried glass containers 12 through the treatment zone Z. The falling cam portion 66 terminates at a location just beyond the end of the article treatment zone Z and terminates at an elevation which allows the cam followers 18 which have been guided by it to be at the same elevation as the cam followers 18 of those grasping means 14 which carried glass containers 12 through the treatment zone Z. Note that the first cam means 20 smoothly meshes with the falling cam portion 66 as the falling cam portion 66 terminates. The first cam means 20 then continues and carries all of the followers 18 at substantially the same elevation.

Figure 3:
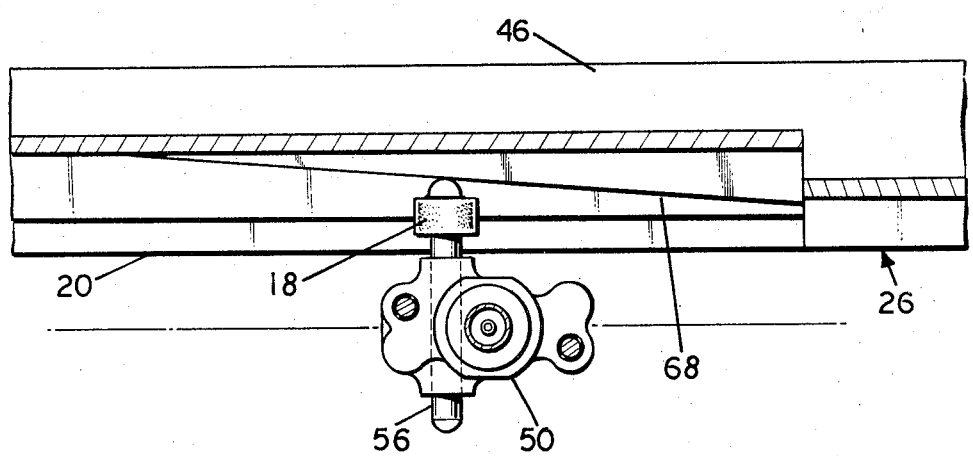
FIG. 3 is a top view, partially in cross section, taken along the line 3—3 of FIG. 1 showing the actual apparatus of the present invention.

With particular reference to FIG. 3, note now that the first cam means 20 must be somewhat widened at this point, since the followers 18 which have been under the control of the second cam means 24 are still moved outwardly with respect to the other cam followers 18. Thus, as a final portion of the second cam means 24, there is provided a second inclined plate cam portion 68 which engages the follower 18, or more properly a portion of the shaft 56 which extends slightly beyond the follower 18, and pushes the shaft 56 back through the follower block 50 such that the cam follower 18 is in the position it held just prior to the article inlet station. Thus, the followers 18 which were under the control of the second cam means 24 are then placed back onto the center line of those cam followers 18 for the follower blocks 50 which were associated with the grasping means 14 which had picked up a glass container 12. With all of the cam followers 18 now traveling on substantially the same center line, these cam followers 18 now all engage the third cam means 26 at the same location and are controlled in their travels in an identical manner. It should thus be appreciated that the second cam means 24 is made up of the first inclined plate cam section 58, the second inclined plate cam section 68, the ramp cam section 68, the ramp cam secton 60 and a control cam section which may be considered to be made up of the rising cam portion 62, the dwell cam portion 64 and the falling cam portion 66. As a final illustration, FIG. 5 shows the position assumed by a grasping means 14 whose cam follower 18 has been controlled by second cam means 24. In this position, it may readily be seen that the cam follower 18 is in the dwell cam portion 64 of the second cam means 24 and that the main spindle 48 has been moved upwardly, thereby moving the grasping means 14 completely clear of the article treatment zone Z.

I claim:

1. In an apparatus of the type, wherein a plurality of chucks linked together into an endless chain are moved in an endless path by a conveying means which supports said plurality of chucks, grasping means carried by said chucks pick up articles from an article inlet station, said chuck including at least one carrier member attached to and movable by said conveying means and a main spindle slidably mounted in said carrier member, said grasping means being attached to one end of said main spindle, said chucks transport said articles through a treatment zone in single file, and said grasping means release said articles at a remote removal station after treatment, the improvement in said apparatus which comprises:

a follower block attached to said main spindle;

a shaft slidably mounted in a hole extending through said follower block, said shaft extending beyond said follower block on both sides thereof;

a cam follower mounted on said shaft on the portion of said shaft extending beyond one side of said follower block;

first cam means for holding said main spindle in a location such that said articles will be transported through said treatment zone in a preferred orientation if said grasping means pick up an article;

second cam means for raising said main spindle to a location such that said grasping means will be clear of said treatment zone if said grasping means do not pick up an article, said second cam means including:

a. a first inclined plate cam section positioned to contact the extending portion of said shaft opposite said cam follower only if an article is not picked up by said grasping means, said plate cam sections extending from a location adjacent the normal pick-up location of said articles to a location adjacent the end of said article inlet station, said plate cam being shaped to push the extending portion of said shaft through said follower block and thereby increase the extension of said cam following beyond said follower block;

b. a ramp cam section positioned to engage said cam follower, said ramp cam section connecting with the end of said plate cam section and terminating adjacent the beginning of said treatment zone; and c. a control cam section positioned to engage said cam follower as it leaves said ramp cam section only when said cam follower has been extended by said inclined plate cam section; and third cam means for lowering said main spindle to pick up articles at said inlet station and for raising said main spindle at said removal station.

2. The apparatus of claim 1, wherein said control cam section includes a rising portion connecting with said ramp cam section to raise said cam follower to a fixed elevation above said treatment zone.

3. The apparatus of claim 1, wherein said control cam section includes a dwell portion to hold said cam follower at a fixed elevation above said treatment zone, said dwell portion being substantially coextensive with said treatment zone.

4. The apparatus of claim 1, wherein said control cam section includes a falling portion to move said cam follower downwardly to the same elevation as those cam followers for said follower blocks which had picked up articles at said article inlet station, said falling portion terminating at a location adjacent to and beyond the end of said article treatment zone.

5. The apparatus of claim 4, wherein said second cam means further includes:

a second inclined plate cam section located at the end of said falling portion and positioned to engage said extended follower, said second inclined plate cam being shaped to push said shaft through said follower block to the position it originally held just prior to said inlet stations to thereby move said previously extending follower back onto the center line of those cam followers for the follower blocks associated with those grasping means which had picked up an article.

6. In an apparatus of the type, wherein a plurality of chucks linked together into an endless chain are moved in an endless path by a conveying means which supports said plurality of chucks, grasping means carried by said chucks pick up articles from an article inlet station, said chucks including at least one carrier member attached to and movable by said conveying means and a main spindle slidably mounted in said carrier member, said grasping means being attached to one end of said main spindle, said chucks transport said articles through a treatment zone in single file, and said grasping means release said articles at a remote removal station after treatment, the improvement in said apparatus which comprises:

a follower block attached to said main spindle;

engagement means, slidably mounted in said follower block, for controlling the position of said main spindle;

first cam means for holding, through engagement with said engagement means, said main spindle in a location such that said articles will be transported through said treatment zone in a preferred orientation if said grasping means pick up an article;

second cam means for sliding said engagement means out of engagement with said first cam means if an article is not picked up by said grasping means and for raising, through engagement with said engagement means, said main spindle to a location such that said grasping means will be clear of said treatment zone if said grasping means do not pick up an article; and third cam means for lowering, through engagement with said engagement means, said main spindle to pick up articles at said inlet station and for raising said main spindle at said removal station to deposit articles.

7. The apparatus of claim 6, wherein said engagement means comprises:

a shaft slidably mounted in a hole extending through said follower block, said shaft extending beyond said follower block on both sides thereof; and a cam follower mounted on said shaft on the portion of said shaft extending beyond one side of said follower block.

8. The apparatus of claim 7, wherein said first cam means comprises:

a track-type cam section positioned to engage said cam follower only if an article has been picked up, said track-type cam section extending from a location intermediate the end of said article inlet station and the beginning of said treatment zone to a location adjacent the beginning of said article removal station.

9. The apparatus of claim 7, wherein said second cam means includes:

a first inclined plate cam section positioned to contact the extending portion of said shaft opposite said cam follower only if an article is not picked up by said grasping means, said plate cam section extending from a location adjacent the normal pickup location of said articles to a location adjacent the end of said article inlet station, said plate cam being shaped to push the extending portion of said shaft through said follower block and thereby increase the extension of said cam follower beyond said follower block;

a ramp cam section positioned to engage said cam follower, said ramp cam section connecting with the end of said plate cam section and terminating adjacent the beginning of said treatment zone; and a control cam section positioned to engage said cam follower as it leaves said ramp cam section only when said cam follower has been extended by said inclined plate cam section.

10. The apparatus of claim 9, wherein said control cam section includes a rising portion connecting with said ramp cam section to raise said cam follower to a fixed elevation above said treatment zone.

11. The apparatus of claim 9, wherein said control cam section includes a dwell portion to hold said cam follower at a fixed elevation above said treatment zone, said dwell portion being substantially coextensive with said treatment zone.

12. The apparatus of claim 9, wherein said control cam section includes a falling portion to move said cam follower downwardly to the same elevation as those cam followers for said follower blocks which had picked up articles at said article inlet station, said falling portion terminating at a location adjacent to and beyond the end of said article treatment zone.

13. The apparatus of claim 12, wherein said second cam means further includes:

a second inclined plate cam section located at the end of said falling portion and positioned to engage said extended follower, said second inclined plate cam being shaped to push said shaft through said follower block to the position it originally held just prior to said inlet station to thereby move said previously extended follower back onto the center line of those cam followers for the follower blocks associated with those grasping means which had picked up an article.

* * * * *